United States Patent
Andersen et al.

(10) Patent No.: US 10,402,081 B1
(45) Date of Patent: Sep. 3, 2019

(54) THUMB SCROLL USER INTERFACE ELEMENT FOR AUGMENTED REALITY OR VIRTUAL REALITY ENVIRONMENTS

(71) Applicant: FMR LLC, Boston, MA (US)

(72) Inventors: James Andersen, Boston, MA (US); Adam Schouela, West Newton, MA (US); Hangyu Wang, Boston, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/115,461

(22) Filed: Aug. 28, 2018

(51) Int. Cl.
| | |
|---|---|
| *G06F 3/0485* | (2013.01) |
| *G06F 3/0481* | (2013.01) |
| *G06F 3/042* | (2006.01) |
| *G06F 3/0488* | (2013.01) |
| *G06F 3/01* | (2006.01) |

(52) U.S. Cl.
CPC .......... *G06F 3/04855* (2013.01); *G06F 3/017* (2013.01); *G06F 3/0425* (2013.01); *G06F 3/04815* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 9,063,644 B2* | 6/2015 | Zeng | ..................... G06F 3/0488 |
| 9,417,754 B2 | 8/2016 | Smith | |
| 2002/0140633 A1 | 10/2002 | Rafii et al. | |
| 2006/0038796 A1 | 2/2006 | Hinckley et al. | |
| 2006/0161870 A1* | 7/2006 | Hotelling | .............. G06F 3/0485 715/863 |
| 2007/0152984 A1* | 7/2007 | Ording | ................ G06F 3/04845 345/173 |
| 2009/0077504 A1* | 3/2009 | Bell | ........................ G06F 3/011 715/863 |
| 2009/0114079 A1 | 5/2009 | Egan | |
| 2009/0273563 A1* | 11/2009 | Pryor | ..................... B60K 35/00 345/157 |
| 2010/0058228 A1* | 3/2010 | Park | .................... G06F 3/04847 715/786 |
| 2011/0289456 A1* | 11/2011 | Reville | ................... G06F 3/011 715/830 |
| 2014/0157209 A1* | 6/2014 | Dalal | ..................... G06F 3/017 715/863 |

(Continued)

*Primary Examiner* — Christopher J Fibbi

(74) *Attorney, Agent, or Firm* — Proskauer Rose LLP

(57) ABSTRACT

Methods and apparatuses are described for providing a thumb scroll user interface element in a computerized visual environment. A viewing device displays a graphical user interface within a three-dimensional space that includes surface planes each associated with a graphical thumb scroll element. A sensor device captures a location of the user's hand within the three-dimensional space and a gesture of the user's hand. A computing device detects that the location is within a defined zone around one of the graphical thumb scroll elements and activates the thumb scroll element associated with the defined zone. The computing device identifies the gesture, determines a scroll speed based upon a speed of the identified gesture, and determines a scroll direction based upon a direction of the identified gesture. The computing device changes characteristics of graphical content in the surface plane based upon at least one of: the scroll speed or the scroll direction.

22 Claims, 4 Drawing Sheets

(56) References Cited

U.S. PATENT DOCUMENTS

2016/0349859 A1* 12/2016 Seitz ................... G06F 3/0362
2017/0213212 A1    7/2017 Dicker et al.
2017/0228120 A1*  8/2017 Phillips ............... G06F 3/0485
2018/0088746 A1*  3/2018 Cheung ................ G06F 3/14
2019/0129607 A1*  5/2019 Saurabh .............. G06F 3/04847

* cited by examiner

US 10,402,081 B1

THUMB SCROLL USER INTERFACE ELEMENT FOR AUGMENTED REALITY OR VIRTUAL REALITY ENVIRONMENTS

TECHNICAL FIELD

This application relates generally to methods and apparatuses, including computer program products, for providing a thumb scroll user interface element in various computerized visual environments, including augmented reality (AR), mixed reality (MR), and virtual reality (VR).

BACKGROUND

In recent years, hardware such as headsets, adapters, and viewers used in virtual reality or augmented reality environments have become widely available. In the case of VR, a user sees a visual environment comprised entirely of computer-generated graphical objects and in the case of AR or MR, a user sees a visual environment comprised of both real-world objects and computer-generated graphics. In either case, the user can interact with the environment by moving his head and/or hands—such movements are captured by the hardware and translated into the computerized environment using specialized software.

However, because of the reliance on a user's gestures and hand movements to interface with VR/AR environments, it is difficult to implement controls and elements that require precise and/or subtle actions, such as those a user might find in a more traditional computer setup that uses a keyboard and mouse (e.g., content scrolling, point-and-click menus, etc.). Typically, such UI controls are hard to properly implement, leading to a less-than-optimal user experience.

SUMMARY

Therefore, what is needed are methods and systems for improved user interface control and operation in computerized visual environments. The techniques described herein provide an advantageous virtual thumb scroll user interface element that is easy to operate and enables a user to accurately and precisely control UI elements such as windows, menus, and other controls in VR, MR, and AR environments.

The invention, in one aspect, features a system for providing a thumb scroll user interface element in a computerized visual environment. The system includes a viewing device that displays, to a user of the viewing device, a graphical user interface within a three-dimensional space, the graphical user interface including one or more surface planes that comprise graphical content, each surface plane associated with a graphical thumb scroll element. The system further includes a sensor device that captures a location and a gesture of the user's hand within the three-dimensional space. The system further includes a computing device coupled to the viewing device and the sensor device. The computing device detects that the location of at least a portion of the user's hand is within a defined zone around one of the graphical thumb scroll elements in the graphical user interface and activates the graphical thumb scroll element associated with the defined zone. The computing device identifies a gesture of the user's hand. The computing device determines a scroll speed of the activated graphical thumb scroll element based upon a speed of the identified gesture. The computing device determines a scroll direction of the activated graphical thumb scroll element based upon a direction of the identified gesture. The computing device changes one or more characteristics of the graphical content in the surface plane that is associated with the activated graphical thumb scroll element, where the one or more characteristics of the graphical content change according to at least one of: the scroll speed or the scroll direction.

The invention, in another aspect, features a computerized method of providing a thumb scroll user interface element in a computerized visual environment. A viewing device displays, to a user, a graphical user interface within a three-dimensional space, the graphical user interface including one or more surface planes that comprise graphical content, each surface plane associated with a graphical thumb scroll element. A sensor device captures a location and a gesture of the user's hand within the three-dimensional space. A computing device coupled to the viewing device and the sensor device detects that the location of at least a portion of the user's hand is within a defined zone around one of the graphical thumb scroll elements in the graphical user interface and activates the graphical thumb scroll element associated with the defined zone. The computing device identifies a gesture of the user's hand. The computing device determines a scroll speed of the activated graphical thumb scroll element based upon a speed of the identified gesture. The computing device determines a scroll direction of the activated graphical thumb scroll element based upon a direction of the identified gesture. The computing device changes one or more characteristics of the graphical content in the surface plane that is associated with the activated graphical thumb scroll element, where the one or more characteristics of the graphical content change according to at least one of: the scroll speed or the scroll direction.

Any of the above aspects can include one or more of the following features. In some embodiments, the viewing device is a virtual reality (VR) headset, an augmented reality (AR) headset, or a mixed reality (MR) headset. In some embodiments, the sensor device is a camera. In some embodiments, the computing device is a processor and a memory that are embedded in the viewing device or in the sensor device.

In some embodiments, changing one or more characteristics of the graphical content in the surface plane comprises moving the graphical content in a direction consistent with the scroll direction. In some embodiments, changing one or more characteristics of the graphical content in the surface plane comprises moving the graphical content at a speed consistent with the scroll speed. In some embodiments, changing one or more characteristics of the graphical content in the surface plane comprises increasing a value displayed in the surface plane or decreasing a value displayed in the surface plane.

In some embodiments, identifying the gesture of the user's hand comprises determining an orientation of the user's hand with respect to the activated graphical thumb scroll element. In some embodiments, determining an orientation of the user's hand comprises determining at least one of: a position of one or more fingers on the user's hand or a relationship between a position of two or more fingers on the user's hand. In some embodiments, movement of the user's hand comprises rotation of at least a portion of the user's hand around the activated graphical thumb scroll element.

In some embodiments, the computing device detects that the location of the user's hand is no longer within the defined zone, and deactivating the activated thumb scroll element. In some embodiments, the computing device generates one or more visual indicators in proximity to the activated graphical thumb scroll element in the graphical user interface. In some embodiments, the one or more visual indicators are arrows indicating scrollable content in the surface plane associated with the activated graphical thumb scroll element.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
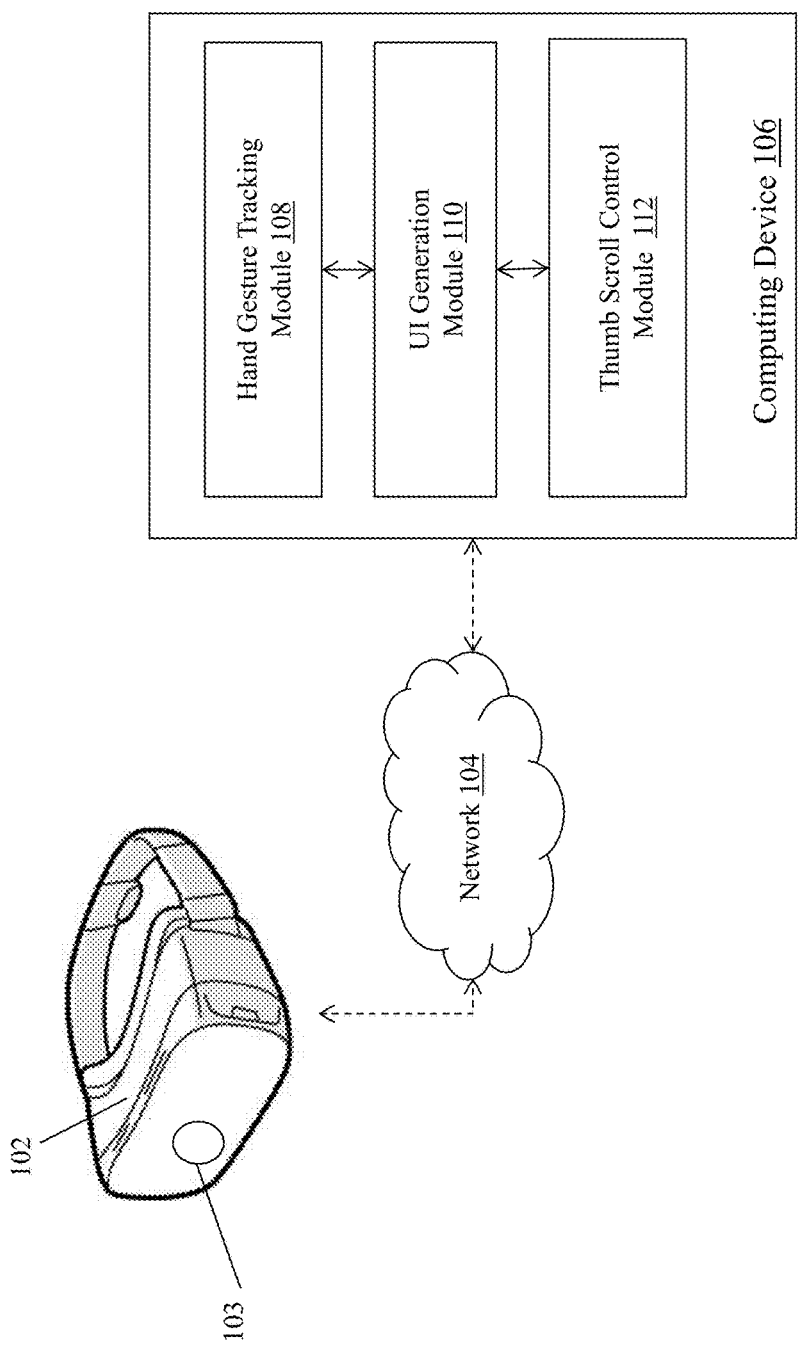
FIG. 1 is a block diagram of a system for providing a thumb scroll user interface element in a computerized visual environment.

FIG. 1 is a block diagram of a system 100 for providing a thumb scroll user interface element in a computerized visual environment. The system 100 includes a viewing device 102, a sensor device 103, a communications network 104, and a computing device 106 that includes a hand gesture tracking module 108, a user interface generation module 110, and a thumb scroll control module 112.

The viewing device 102 enables a user to view computerized visual content, such as graphics, video, and related user interface elements in AR, VR, or MR environments, while the sensor device 103 (e.g., a camera) captures images of the user's hands as he or she moves within a physical environment. In some embodiments (as shown in FIG. 1), the viewing device 102 and the sensor device 103 are embedded in a headset that a user wears to interact with the computerized visual content. In these embodiments, the headset can be equipped with circuitry and devices that enable the headset to, e.g., detect and track movement of the user's head/body in addition to the user's hands. Exemplary headsets include, but are not limited to, the Meta 2™ AR headset available from Meta Company of San Mateo, Calif.; the VIVE™ VR System available from HTC Corporation of Taiwan; and the HoloLens™ available from Microsoft Corporation of Seattle, Wash. It should be appreciated that other embodiments of the viewing device 102 and sensor device 103 can be used within the scope of invention described herein. For example, in some embodiments, the viewing device 102 and the sensor device 103 can be configured in separate physical devices that are coupled together via a network connection.

The viewing device 102 and sensor device 103 connect to the communications network 104 in order to communicate with the computing device 106 to provide input and receive output relating to providing a thumb scroll user interface element in a computerized visual environment as described herein. The network 104 is typically a wide area network, such as the Internet and/or a cellular network. In some embodiments, the network 104 is comprised of several discrete networks and/or sub-networks (e.g., cellular to Internet). In some embodiments, the viewing device 102 and sensor device 103 can connect to the computing device 106 via a physical connection (e.g., cable).

The computing device 106 is a device including specialized hardware and/or software modules that execute on a processor and interact with memory modules of the server computing device 106, to receive data from other components of the system 100, transmit data to other components of the system 100, and perform functions relating to providing a thumb scroll user interface element in a computerized visual environment as described herein. The computing device 106 includes several computing modules 108, 110, 112 that execute on the processor of the server computing device 106. In some embodiments, the modules 108, 110, 112 are specialized sets of computer software instructions programmed onto one or more dedicated processors in the computing device 106 and can include specifically-designated memory locations and/or registers for executing the specialized computer software instructions.

Although the modules 108, 110, 112 are shown in FIG. 1 as executing within the same computing device 106, in some embodiments the functionality of the modules 108, 110, 112 can be distributed among a plurality of computing devices. As shown in FIG. 1, the computing device 106 enables the modules 108, 110, 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110, 112 is described in detail below.

Also, it should be appreciated that, in some embodiments, the processing performed by the computing device 106 can be incorporated into a single device that also includes the viewing device 102 and the sensor device 103. For example, a headset can include an embedded processor and memory that is programmed with modules 108, 110, 112 to perform the functions described herein.

Figure 2:
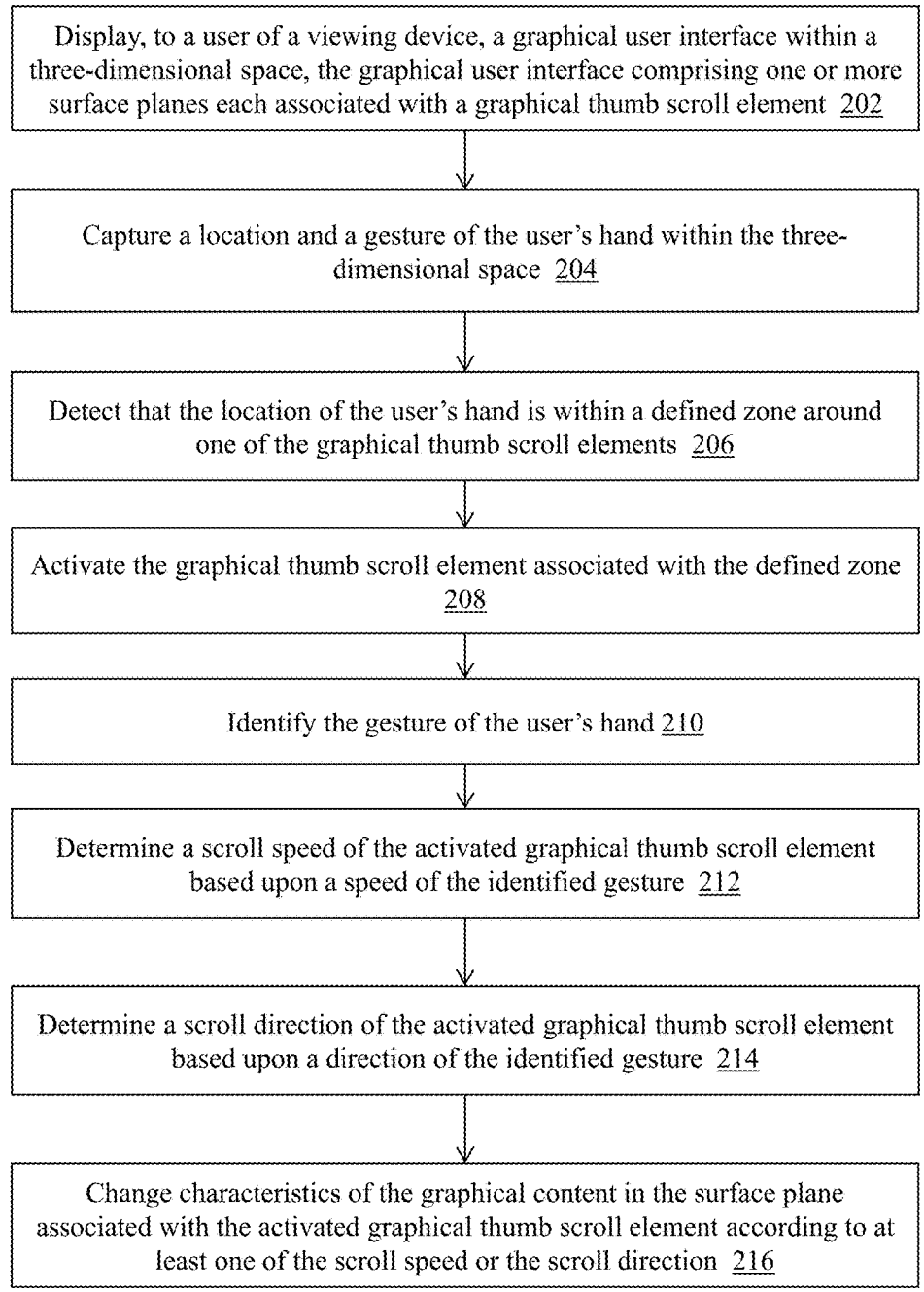
FIG. 2 is a flow diagram of a computerized method of system for providing a thumb scroll user interface element in a computerized visual environment.

FIG. 2 is a flow diagram of a computerized method 200 of providing a thumb scroll user interface element in a computerized visual environment, using the system 100 of FIG. 1. A user (e.g., wearing an AR/MR/VR headset as described above) views (202) a computerized visual environment that comprises graphical content within a three-dimensional space. The graphical content includes a graphical user interface (GUI) with which the user interacts to control aspects of the graphical content. The GUI includes one or more surface planes (e.g., menus, windows, widgets, etc.) that is each associated with a graphical thumb scroll element.

Figure 3:
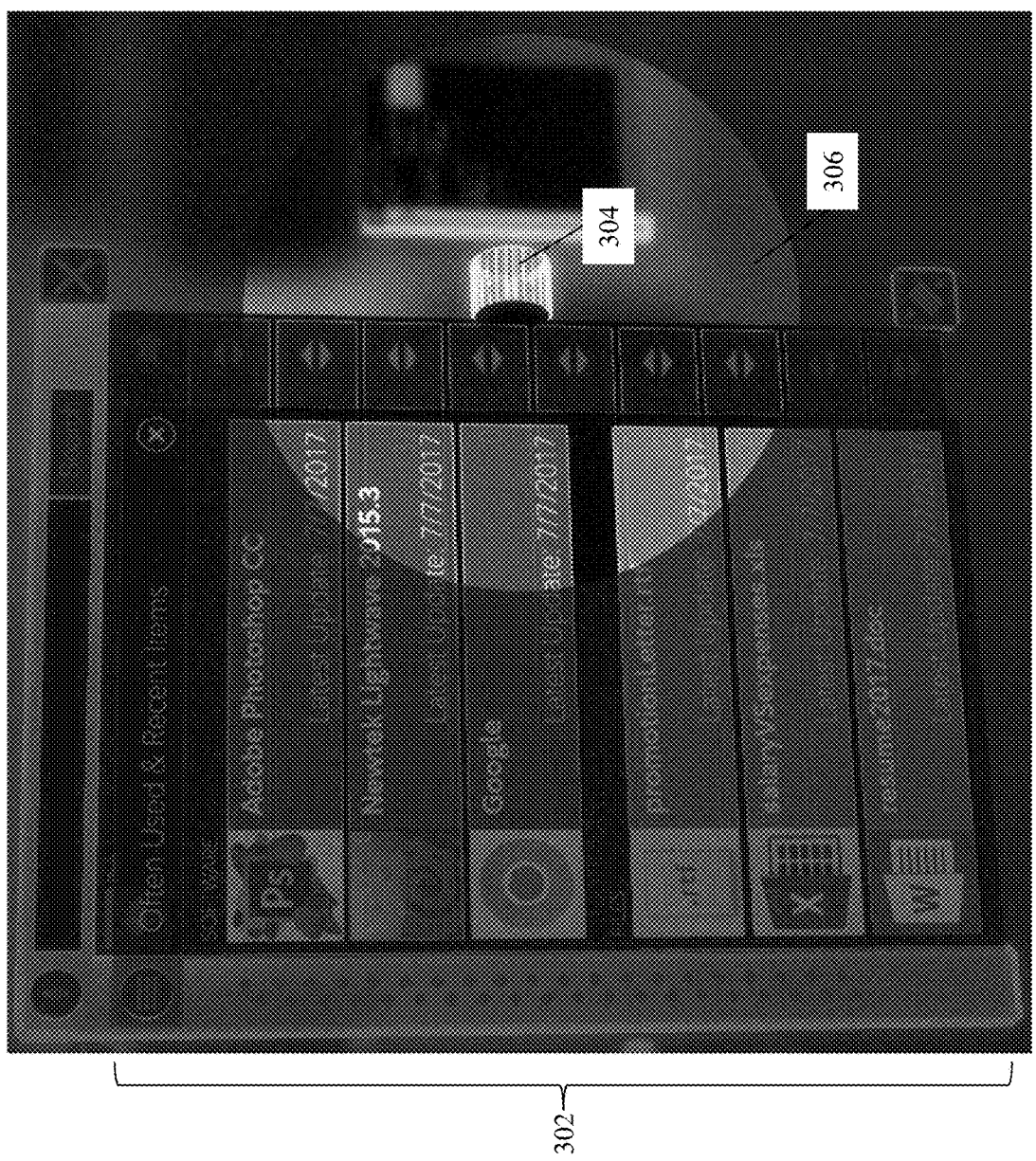
FIG. 3 is a diagram of an exemplary GUI generated by the system for presentation to a user via the viewing device.

FIG. 3 is a diagram of an exemplary GUI generated by the system 100 for presentation to a user via the viewing device 102. As shown in FIG. 3, the GUI includes a surface plane 302 that comprises a menu from which the user can choose an application to launch. For example, the user can move his hands within the three-dimensional space in front of him, and the sensor device 103 captures (204) the location, gesture, and movement of the user's hands within the three-dimensional space (e.g., by capturing images of the user's hands as they move within the space and analyzing the images using an object detection/tracking algorithm to determine the location, gesture, and movement). In some embodiments, the sensor device 103 and/or viewing device 102 (in coordination with the hand gesture tracking module 108 of computing device 106) translates the location of the user's hands from a first coordinate system (e.g., coordinates in physical space) to a second coordinate system (e.g., coordinates in the virtual space shown to the user via the viewing device 102) so that the location of the user's hands can be synchronized to locations of graphical objects in the virtual space—such as the surface planes and graphical thumb scroll elements described herein.

For example, the hand gesture tracking module 108 can receive the captured location, gesture and movement data from the sensor device 103 and execute the object detection/tracking algorithm to map the location of the user's hand to the coordinate system used in the virtual environment. The hand gesture tracking module 108 transmits the mapped location to the UI generation module 110, which generates the graphical user interface to be displayed to the user via viewing device 102. The UI generation module 110 incorporates the user's hand location, gesture, and movement information into the generation of the GUI by, e.g., activating/deactivating user interface elements based upon the hand characteristics, launching applications selected based upon the hand characteristics, and so forth.

Continuing with FIG. 3, a graphical thumb scroll element 304 is associated with the surface plane 302. As shown, the graphical thumb scroll element 304 is a cylindrical knob positioned on the right side of the surface plane 302 that is configured to change the graphical content in the surface plane 302 upon manipulation by the user. In this example, when a user turns the graphical thumb scroll element, the menu content scrolls up or down depending on which direction the thumb scroll element is turned.

In order to achieve this, the thumb scroll control module 112 of computing device 106 receives the hand location, gesture, and movement data from the UI generation module 110 and detects (206) that the location of the user's hand is within a defined zone around one of the graphical thumb scroll elements in the GUI. As shown in FIG. 3, the defined zone 306 is a three-dimensional sphere with the graphical thumb scroll element 304 at the center of the zone. The thumb scroll control module 112 can be configured with coordinate data for each of the graphical thumb scroll elements in the GUI, where the coordinate data defines the center of the zone (i.e., the location of the thumb scroll element in the three-dimensional space) and the boundaries of the zone (i.e., locations that are a prescribed distance from the location of the thumb scroll element in three dimensions).

Upon detecting that at least a portion of the user's hand (e.g., thumb and forefinger) are within the defined zone around the graphical thumb scroll element 304, the thumb scroll control module 112 activates (208) the graphical thumb scroll element 304 associated with the defined zone 306, by, e.g., enabling it for manipulation by the user. In some embodiments, the thumb scroll control module 112 can transmit instructions to the UI generation module 110 that the graphical thumb scroll element 304 is active and the UI generation module 110 can alter the appearance of the activated graphical thumb scroll element 304 in the user interface. For example, the UI generation module 110 can highlight the activated graphical thumb scroll element 304, add visual elements (e.g., up/down arrows) in proximity to the activated graphical thumb scroll element 304 or the surface plane 302 to inform the user that scrollable/changeable content exists, and the like.

Figure 4:
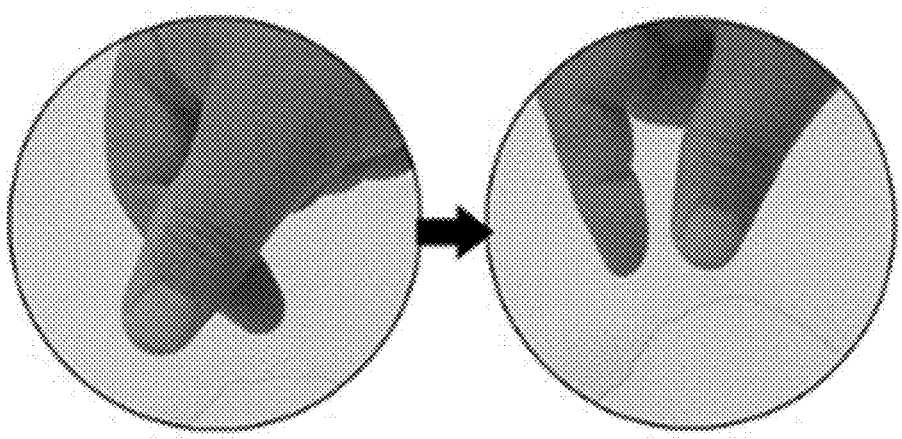
FIG. 4 is a diagram of exemplary hand gestures captured by the sensor device and analyzed by the thumb scroll control module to determine scroll speed and scroll direction.
Figure 4:
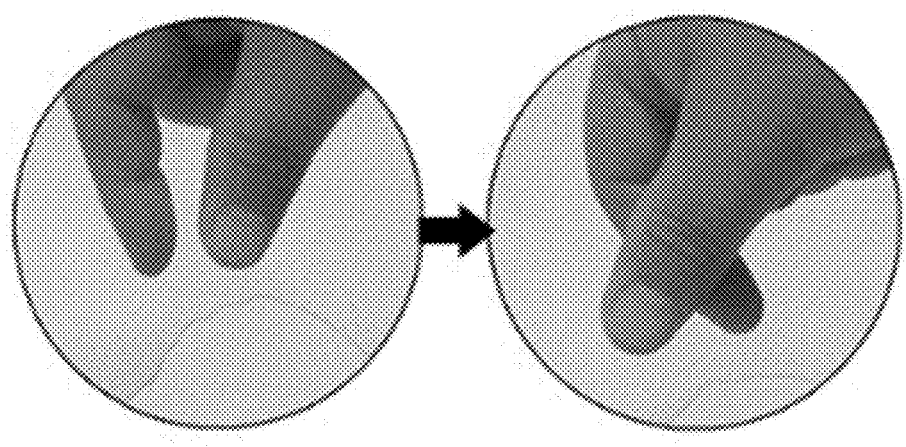

After the graphical thumb scroll element 304 is activated, the thumb scroll control module 112 identifies (210) the gesture of the user's hand as captured by the sensor module 103, determines (212) a scroll speed of the activated graphical thumb scroll element 304 based upon a speed of the identified gesture, and determines (214) a scroll direction of the activated graphical thumb scroll element based upon a direction of the identified gesture. FIG. 4 is a diagram of exemplary hand gestures captured by the sensor device 103 and analyzed by the thumb scroll control module 112 to determine scroll speed and scroll direction. As shown in FIG. 4, a user can place his or her thumb and forefinger within the defined zone of a graphical thumb scroll element 304. To scroll up the graphical content in the associated surface plane, the user can rotate his thumb and forefinger in a forward motion around the graphical thumb scroll element 304—so that the thumb starts below (or in front of) the graphical thumb scroll element 304 and moves upward around the front side of the element, while at the same time the forefinger starts above (or behind) the graphical thumb scroll element 304 and moves downward around the back side of the element. Similarly, to scroll down the graphical content, the user can rotate his thumb and forefinger in the reverse manner—so that the thumb starts above (or in front of) the graphical thumb scroll element 304 and moves downward around the front side of the element, while at the same time the forefinger starts above (or behind) the graphical thumb scroll element 304 and moves upward around the back side of the element. Of course, it should be appreciated that the gestures in FIG. 4 are exemplary and that other types of gestures can be incorporated for use in the methods and systems described herein.

To identify the gesture, the thumb scroll control module 112 analyzes the images of the user's hand captured by the sensor device 103 to determine, e.g., position and orientation of the portion of the user's hand as it moves within the defined zone—including, in some embodiments, position and orientation of specific fingers on the user's hand (such as thumb and forefinger). The thumb scroll control module 112 can utilize object and/or shape recognition algorithms to determine features of the user's hand (e.g., fingers, fingernails, knuckles, etc.) and analyze the spatial relationship of those features as they move in consecutive images to determine a gesture of the hand. Using the example in FIG. 4, the thumb scroll control module 112 can identify the gesture as the user's thumb and forefinger in a circular orientation (e.g., forming the letter 'C') around the graphical thumb scroll element 304. In some embodiments, the thumb scroll control module 112 can compare the captured images of the user's hand from the sensor device 103 to pre-stored images of hand gestures/shapes to determine matches or similarities, in order to identify the gesture.

To determine a scroll speed of the activated graphical thumb scroll element 304, the thumb scroll control module 112 determines how fast the user's hand is moving within the defined zone 306 around the graphical thumb scroll element 304. For example, in the case of FIG. 4, the sensor device 103 captures the gesture of the user's thumb and forefinger, and the thumb scroll control module 112 determines a speed of the gesture by, e.g., determining how far the user's hand (or one or more portions of the hand) moved between two or more images captured at a specific time interval. In some embodiments, the thumb scroll control module 112 determines a start of the hand gesture and an end of the hand gesture in order to calculate the speed of movement in between the start and the end. The module 112 can then translate the user's hand speed to a corresponding speed of the thumb scroll element 304.

To determine a scroll direction of the activated graphical thumb scroll element 304, the thumb scroll control module 112 determines in what direction the user's hand is moving within the defined zone 306 around the graphical thumb scroll element 304. As described above with respect to FIG. 4, the thumb scroll control module 112 can determine that the user's thumb is moving in an upward direction in front of the thumb scroll element 304 while the user's forefinger is moving in a downward direction behind the thumb scroll element 304. Therefore, the thumb scroll control module 112 determines that the user is performing a 'scroll up' gesture and assigns the scroll direction accordingly.

Once the scroll speed and scroll direction of the activated graphical thumb scroll element 304 are determined, the thumb scroll control module 112 transmits the scroll speed and scroll direction to the UI generation module 110. The module 110 changes (216) one or more characteristics of the graphical content in the surface plane that is associated with the activated graphical thumb scroll element 304, based upon the scroll speed and the scroll direction. For example, in the case of FIG. 3, the UI generation module 110 uses the scroll speed and scroll direction to move the menu content up or down at a specific speed—and the user experiences the menu changing in real time (e.g., with no or minimal delay) as he or she manipulates the thumb scroll element, so that it feels like the user is physically operating a thumb scroll to move the menu. When the user moves his or her hand away from the defined zone 306 around the thumb scroll element 304, the thumb scroll control module 112 detects that the location of the user's hand is no longer within the defined zone and deactivates the associated thumb scroll element 304.

In some embodiments, the thumb scroll control module 112 can apply programmed 'friction' to the graphical thumb scroll element 304 in order to synchronize the movement of the graphical thumb scroll element to the movement of the graphical content, thereby making the experience more realistic to the user. For example, if a user turns the graphical thumb scroll element 304 at a certain speed and then abruptly stops, the thumb scroll control module 112 (in coordination with the UI generation module 110) can continue to move the thumb scroll element 304 and the graphical content in surface plane 302 at relative speeds (even though the user is no longer moving his or her hand), gradually slowing down until the element 304 and the content come to a stop. In this way, the operation of the graphical thumb scroll element 304 feels more natural to the user.

While the above examples relate to graphical content comprising a menu in the surface plane, it should be appreciated that other types of graphical content can be implemented for use with the methods and systems described herein. For example, the graphical content can be a displayed value that is changed by operation of the associated graphical thumb scroll element, where turning the thumb scroll element forward increases the displayed value and turning the thumb scroll element backward decreases the displayed value (as in a volume control knob or similar controls).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for providing a thumb scroll user interface element in a computerized visual environment, the system comprising:
    a viewing device that displays, to a user of the viewing device, a graphical user interface within a three-dimensional space, the graphical user interface including one or more surface planes that comprise graphical content, each surface plane associated with a graphical thumb scroll element,
    wherein the viewing device is a virtual reality (VR) headset, an augmented reality (AR) headset, or a mixed reality (MR) headset, and
    wherein the graphical thumb scroll element is a cylindrical knob attached to the corresponding surface plane and capable of being turned;
    a sensor device that captures a location of the user's thumb and finger within the three-dimensional space and a gesture of the user's thumb and finger; and
    a computing device coupled to the viewing device and the sensor device that:
        detects that the location of at least a portion of the user's thumb and finger are within a defined zone around one of the graphical thumb scroll elements;
        activates the graphical thumb scroll element associated with the defined zone;
        identifies that the gesture of the user's thumb and finger comprises a rotation of the thumb and finger around the cylindrical knob;
        determines a scroll speed of the activated graphical thumb scroll element based upon a speed of the rotation of the thumb and finger around the cylindrical knob;
        determines a scroll direction of the activated graphical thumb scroll element based upon a direction of the rotation of the thumb and finger around the cylindrical knob;
        changing one or more characteristics of the graphical content in the surface plane of the graphical user interface that is associated with the activated graphical thumb scroll element, wherein the one or more characteristics of the graphical content change according to the determined scroll speed and the determined scroll direction.

2. The system of claim 1, wherein the sensor device is a camera.

3. The system of claim 1, wherein the computing device is a processor and a memory that are embedded in the viewing device or in the sensor device.

4. The system of claim 1, wherein changing one or more characteristics of the graphical content in the surface plane comprises moving the graphical content in a direction consistent with the scroll direction.

5. The system of claim 1, wherein changing one or more characteristics of the graphical content in the surface plane comprises moving the graphical content at a speed consistent with the scroll speed.

6. The system of claim 1, wherein changing one or more characteristics of the graphical content in the surface plane comprises increasing a value displayed in the surface plane or decreasing a value displayed in the surface plane.

7. The system of claim 1, wherein identifying the gesture of the user's thumb and finger comprises determining an orientation of the user's thumb and finger with respect to the activated graphical thumb scroll element.

8. The system of claim 7, wherein determining an orientation of the user's thumb and finger comprises determining at least one of: a position of the thumb and finger or a relationship between a position of the thumb and the finger on the user's hand.

9. The system of claim 1, further comprising detecting that the location of at least one of the user's thumb or finger is no longer within the defined zone, and deactivating the activated thumb scroll element.

10. The system of claim 1, further comprising generating one or more visual indicators in proximity to the activated graphical thumb scroll element in the graphical user interface.

11. The system of claim 10, wherein the one or more visual indicators are arrows indicating scrollable content in the surface plane associated with the activated graphical thumb scroll element.

12. A computerized method of providing a thumb scroll user interface element in a computerized visual environment, the method comprising:
- displaying, by a viewing device to a user of the viewing device, a graphical user interface within a three-dimensional space, the graphical user interface including one or more surface planes that comprise graphical content, each surface plane associated with a graphical thumb scroll element,
- wherein the viewing device is a virtual reality (VR) headset, an augmented reality (AR) headset, or a mixed reality (MR) headset, and
- wherein the graphical thumb scroll element is a cylindrical knob attached to the corresponding surface plane and capable of being turned;
- capturing, by a sensor device, a location of the user's thumb and finger within the three-dimensional space and a gesture of the user's thumb and finger;
- detecting, by a computing device coupled to the viewing device and the sensor device, that the location of at least a portion of the user's thumb and finger are within a defined zone around one of the graphical thumb scroll elements in the graphical user interface;
- activating, by the computing device, the graphical thumb scroll element associated with the defined zone;
- identifying, by the computing device, that the gesture of the user's thumb and finger comprises a rotation of the thumb and finger around the cylindrical knob;
- determining, by the computing device, a scroll speed of the activated graphical thumb scroll element based upon a speed of the rotation of the thumb and finger around the cylindrical knob;
- determining, by the computing device, a scroll direction of the activated graphical thumb scroll element based upon a direction of the rotation of the thumb and finger around the cylindrical knob; and
- changing one or more characteristics of the graphical content in the surface plane of the graphical user interface that is associated with the activated graphical thumb scroll element, wherein the one or more characteristics of the graphical content change according to: the determined scroll speed and the determined scroll direction.

13. The method of claim 12, wherein the sensor device is a camera.

14. The method of claim 12, wherein the computing device is a processor and a memory that are embedded into the viewing device or the sensor device.

15. The method of claim 12, wherein changing one or more characteristics of the graphical content in the surface plane comprises moving the graphical content in a direction consistent with the scroll direction.

16. The method of claim 12, wherein changing one or more characteristics of the graphical content in the surface plane comprises moving the graphical content at a speed consistent with the scroll speed.

17. The method of claim 12, wherein changing one or more characteristics of the graphical content in the surface plane comprises increasing a value displayed in the surface plane or decreasing a value displayed in the surface plane.

18. The method of claim 12, wherein identifying the gesture of the user's thumb and finger comprises determining an orientation of the user's thumb and finger with respect to the activated graphical thumb scroll element.

19. The method of claim 18, wherein determining an orientation of the user's thumb and finger comprises determining at least one of: a position of the thumb and finger or a relationship between a position of the thumb and the finger on the user's hand.

20. The method of claim 12, wherein the computing device detects that the location of at least one of the user's thumb or finger is no longer within the defined zone, and deactivating the activated thumb scroll element.

21. The method of claim 12, wherein the computing device generates one or more visual indicators in proximity to the activated graphical thumb scroll element in the graphical user interface.

22. The method of claim 21, wherein the one or more visual indicators are arrows indicating scrollable content in the surface plane associated with the activated graphical thumb scroll element.

* * * * *

UNITED STATES PATENT AND TRADEMARK OFFICE
CERTIFICATE OF CORRECTION

PATENT NO. : 10,402,081 B1
APPLICATION NO. : 16/115461
DATED : September 3, 2019
INVENTOR(S) : Andersen et al.

Page 1 of 1

It is certified that error appears in the above-identified patent and that said Letters Patent is hereby corrected as shown below:

In the Claims

In Claim 12, Column 12, Line 14, delete "according to:" and replace it with "according to"

Signed and Sealed this
Thirteenth Day of October, 2020

Andrei Iancu
*Director of the United States Patent and Trademark Office*